US008238431B2

(12) United States Patent
Oz

(10) Patent No.: US 8,238,431 B2
(45) Date of Patent: Aug. 7, 2012

(54) METHOD AND SYSTEM FOR RATE REDUCTION OF VIDEO STREAMS

(75) Inventor: Ran Oz, Modiin (IL)

(73) Assignee: ARRIS Solutions, Inc., Suwanee, GA (US)

(*) Notice: Subject to any disclaimer, the term of this patent is extended or adjusted under 35 U.S.C. 154(b) by 685 days.

(21) Appl. No.: 12/398,208

(22) Filed: Mar. 5, 2009

(65) Prior Publication Data
US 2009/0225853 A1 Sep. 10, 2009

Related U.S. Application Data

(60) Provisional application No. 61/034,183, filed on Mar. 6, 2008.

(51) Int. Cl.
*H04N 7/12* (2006.01)
*H04B 1/66* (2006.01)

(52) U.S. Cl. ......... 375/240.16; 375/240.12; 375/240.01; 375/240.25

(58) Field of Classification Search .............. 375/240.16
See application file for complete search history.

(56) References Cited

U.S. PATENT DOCUMENTS
4,698,672 A * 10/1987 Chen et al. .............. 375/240.12
6,597,402 B1 * 7/2003 Butler et al. .................. 348/447

FOREIGN PATENT DOCUMENTS
WO   WO2005065030   * 7/2005

* cited by examiner

*Primary Examiner* — Joseph Ustaris
*Assistant Examiner* — Anner Holder
(74) *Attorney, Agent, or Firm* — Troy A. Van Aacken; Robert J. Starr

(57) ABSTRACT

A method for rate reduction of a video stream, the method includes: selecting a non-reference picture of a video stream; and replacing the non-reference picture by a duplicating picture that substantially consists of information that instruct a decoder to duplicate another picture that differs from the non-reference picture; wherein the duplicating picture is smaller than the non-reference picture.

18 Claims, 2 Drawing Sheets

METHOD AND SYSTEM FOR RATE REDUCTION OF VIDEO STREAMS

CROSS REFERENCE TO RELATED APPLICATIONS

This application claims the benefit of U.S. Provisional Patent Application No. 61/034,183, filed on Mar. 6, 2008, which is incorporated in its entirety herein by reference.

FIELD OF THE INVENTION

The invention relates to methods and systems for rate reduction of video streams.

BACKGROUND OF THE INVENTION

The ability of a device to perform rate reduction on a compressed stream (such as an MPEG stream) is required in more and more cases, ranging from cable systems to Telco and wireless systems. Usually, the rate is reduced by different methods such as re-quantization, re-encoding and similar. If this doesn't succeed in reducing the bit rate enough, some data may be discarded.

A few different activities are involved in rate reduction—these include buffer analysis, timing decisions, actual reduction and more. The actual reduction of bits is a costly and processing-heavy activity as it usually requires at least partial decoding and encoding.

Expensive resources are allocated for this task in terms of computing power and often real cost. As the need for rate reduction grows, there is a growing need to find cheaper methods of rate reduction of video streams.

SUMMARY

A method for rate reduction of a video stream, the method includes: selecting a non-reference picture of a video stream; and replacing the non-reference picture by a duplicating picture that substantially consists of information that instruct a decoder to duplicate another picture that differs from the non-reference picture; wherein the duplicating picture is smaller than the non-reference picture.

The duplicating picture can be a small fraction of the non-reference picture it replaces. For example it can be smaller than half of the non-reference picture.

The duplicating picture can represent a functional that is responsive to multiple reference pictures.

The method can include generating a duplicating picture without motion vector fields; wherein a lack of motion vector fields in the duplicating picture is interpreted by a decoder as being indicative of a lack of motion.

The method can include generating a duplicating picture that substantially consists of a group of motion vector fields; wherein each motion vector of the motion vector fields is interpreted by a decoder as being indicative of a lack of motion; wherein a maximal number of motion vectors within the non-reference picture is larger than a number of motion vectors of the group of motion vectors.

The maximal number of motion vectors within the non-reference picture is at least four times bigger than a number of motion vectors of the group of motion vectors.

The maximal number of motion vectors within the non-reference picture is at least ten times bigger than a number of motion vectors of the group of motion vectors.

The method can include selecting the non-reference picture in response to a resemblance between the non-reference picture and the other picture.

The method can include selecting a sequence of non-reference pictures of a video stream and replacing each of the sequence of the non-reference pictures by the duplicating picture.

The method can include selecting the sequence of non-reference pictures of the video stream in response to a resemblance between each of the sequence of non-reference pictures and the other picture.

The selecting is responsive to at least one parameter selected from a list consisting of: a required bit rate, a quality parameter, and an outcome of an emulation of the decoder.

A system for rate reduction of a video stream, the system includes: a memory unit configured to store pictures of a video stream; a processor configured to select a non-reference picture of a video stream; and replace the non-reference picture by a duplicating picture that substantially consists of information that instruct a decoder to duplicate another picture that differs from the non-reference picture; wherein the duplicating picture is smaller than the non-reference picture.

The processor can be configured to generate a duplicating picture without motion vector fields; wherein a lack of motion vector fields in the duplicating picture is interpreted by a decoder as being indicative of a lack of motion.

The processor can be configured to generate a duplicating picture that substantially consists of a group of motion vector fields; wherein each motion vector of the motion vector fields is interpreted by a decoder as being indicative of a lack of motion; wherein a maximal number of motion vectors within the non-reference picture is larger than a number of motion vectors of the group of motion vectors.

The processor can be configured to select the non-reference picture in response to a resemblance between the non-reference picture and the other picture.

The processor can be configured to select a sequence of non-reference pictures of a video stream and replace each of the sequence of the non-reference pictures by the duplicating picture.

The processor can be configured to select the sequence of non-reference pictures of the video stream in response to a resemblance between each of the sequence of non-reference pictures and the other picture.

The processor can be configured to select in response to at least one parameter selected from a list consisting of: a required bit rate, a quality parameter, and an outcome of an emulation of the decoder.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE INVENTION

Figure 1:
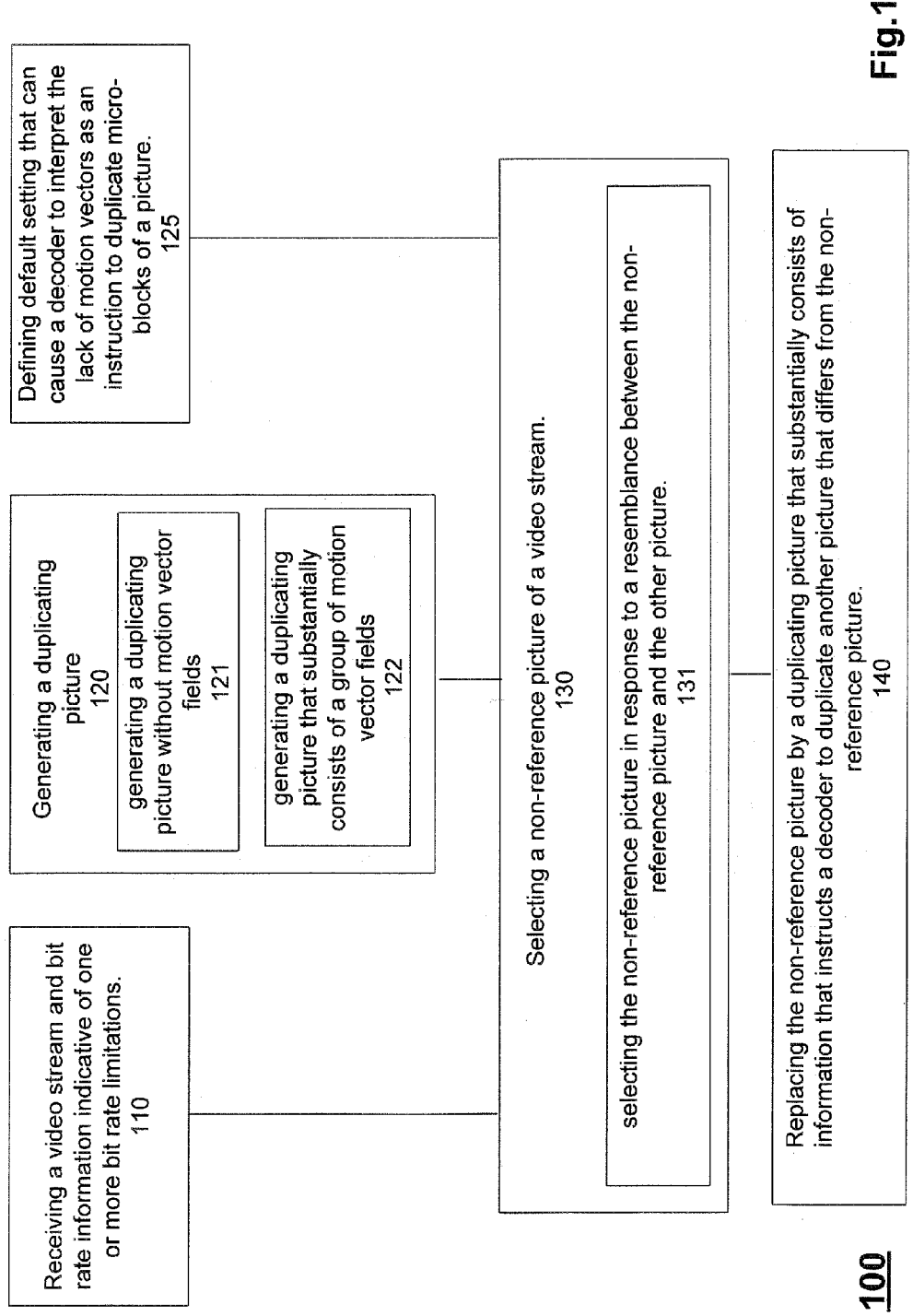
FIG. 1 illustrates a method, according to an embodiment of the invention.

Compressed video streams (such as MPEG2 or H.264) conveniently include both reference pictures which serve as a reference for other pictures (i.e. the information of the other picture is responsive to the reference picture, usually indicating changes between the pictures), and non-reference pictures, which do not serve as a reference to any other picture, thus a modification of which will not affect any other picture. In MPEG2 video compression, B-pictures are not used as reference pictures while I-pictures (also referred to as I-frames) and P-pictures (also referred to as P-frames) can be used as reference pictures. In H.264 compression, different picture types may be used as non-reference pictures. It is noted that even B-pictures can be regarded, by some standards, as a reference frame.

As aforementioned, a reference picture is a picture that is used in decoding of additional pictures. Therefore, if it is altered, more than one picture may show artifacts. Non-reference pictures do not influence the decoding of other pictures and therefore are usually the target for bit reduction.

The present solution offers a novel method of reducing bit rate by discarding non-reference pictures and replacing them by duplicating pictures. The duplicating pictures replacing the discarded non-reference pictures are also non-reference pictures that instruct the decoder to copy a picture that was already decoded and display it again. These pictures require very small amounts of bits.

According to an embodiment of the invention a duplicating picture represents a combination (for example—an average) of multiple reference pictures. For an example, in MPEG-2 a B-picture can include motion vectors to a previous picture and a next picture. If both motion vectors are taken into account and if the motion vectors of a duplicating picture are zero then these previous and next picture are averaged.

The duplicating pictures may be used to instruct the decoder also to copy a picture that should be displayed only after the discarded picture (a duplication of future image). The choice of duplicating a past or future picture can be done by a rate-reducing device based on different reasons including the motion vectors of the discarded picture.

There is a big difference between discarding pictures and between discarding that is followed by inserting duplicating pictures into the stream, as discarding alone may create an illegal stream and may cause unexpected behavior in the decoder.

According to an aspect of the invention, a method for rate reduction of video streams is offered.

According to an embodiment of the invention, the method starts with partially decoding the video stream.

The method starts (or continues) with selecting a non-reference picture of the video stream, according to at least one non-reference picture selection rule. It is noted that, according to an embodiment of the invention, the selecting of the non-reference picture is preceded by detecting non-reference pictures of the video stream or of a portion thereof.

It is further noted that conveniently, the method includes selecting and replacing multiple non-reference picture, wherein one or more of the at least one non-reference picture selection rule may pertain to the selection of multiple non-reference pictures. It is further noted that one or more of the at least one non-reference picture selection rule conveniently pertains to reference pictures as well as to non-reference pictures. According to an embodiment of the invention, one or more of the at least one non-reference picture selection rule pertains to motion vectors of one or more pictures of the video stream.

It is noted that, according to an embodiment of the invention, one or more of the at least one non-reference picture selection rules (directed to select one or more non-reference pictures of the video stream) may be responsive to a required bit-rate, pertaining to a rate reduced video stream provided by the system, and/or to other quality factors, or additional factors. Additionally, the selecting of the one or more non-reference picture may be responsive to an emulation of a receiving device.

The method continues with replacing the non-reference picture by a duplicating picture that causes a decoder to duplicate another picture of the video stream—a picture that differs from the replaced non-reference picture. It is noted that the duplication is conveniently an instruction to read the information pertaining to the duplicated picture. Furthermore, conveniently the duplicated picture used for the replacing is adjacent to the replaced non-reference picture (i.e. either immediately preceding it or immediately following it).

It is noted that, according to an embodiment of the invention, the replacing is preceded by a stage of selecting a picture to be duplicated, according to at least one duplicated picture selection rule. Conveniently, the at least one duplicated picture selection rule is directed to select between the a reference picture that is a picture immediately preceding the non-reference picture and between another reference picture that is the picture that immediately follows the non-reference picture.

According to an embodiment of the invention, one or more of the at least one duplicated picture selection rules pertain to motion vectors of one or more pictures of the video stream.

It is clear to a person who is skilled in the art that the replacing results in a rate reduction of the video stream (or of a portion thereof.

As aforementioned, the selecting and replacing of the non-reference picture may be repeated for multiple non-reference pictures.

The method conveniently continues with providing the rate reduced video stream to an external system. It is noted that while the rate reduced video stream includes at least one duplication of a picture that replaces a non-reference picture, at least one other rate reduction technique (many of which are known in the art) before providing the rate reduced video stream. Likewise, the video stream may be received for non-reference pictures replacement after at least one other rate reductions technique have been applied to it, and/or the rate reduced video stream may be provided to further rate reduction by another at least one rate reduction techniques.

As at least one other rate reduction technique may be applied to the video stream on top of the non-reference picture replacement herein disclosed, it is noted that, according to an embodiment of the invention, at least one of the aforementioned selection rules is further responsive to at least one other rate reduction techniques. Especially, at least one of the aforementioned selection rules may apply both to the replacement of a non-reference picture as herein disclosed, and to another technique together, considering both of the techniques and application thereof to the video stream before selection.

It is further clear to a person who is skilled in the art that the method could also be applied only to a portion of a video stream. Additionally, the method could be applied to multiple video streams (or portions thereof transmitted together, wherein at least one of the aforementioned selection rules may be pertain to multiple video streams (or portions thereof.

FIG. 1 illustrates method 100 according to an embodiment of the invention.

Method 100 starts by stages 110, 120 and 125.

Stage 110 includes receiving a video stream and bit rate information indicative of one or more bit rate limitations. It is noted that the bit rate information can be received before the video stream is received, while the video stream is received and even after the video stream is received. In any case the bit rate information can affect future transmissions of the video stream.

Stage 120 includes generating a duplicating picture. It is noted that stage 120 can be executed in advance ("off-line") or in parallel to stage 110.

Stage 125 includes defining default setting that can cause a decoder to interpret the lack of motion vectors as an instruction to duplicate macro-blocks of a picture.

Stages 110, 120 and 125 are followed by stage 130 of selecting a non-reference picture of a video stream. Stage 130 can include selecting multiple non-reference pictures.

Stage 130 is followed by stage 140 of replacing the non-reference picture by a duplicating picture that substantially consists of information that instructs a decoder to duplicate another picture that differs from the non-reference picture. The other picture can be a reference picture.

The duplicating picture is smaller than the non-reference picture—thus a rate reduction is obtained.

The duplicating picture can be smaller than half of the non-reference picture, smaller than one fifth of the non-reference picture and the like. The size difference can be contributed to the presence of multiple (even many) motion vectors within the non-reference picture and the lack of motion vectors (or the inclusion of few motion vectors) within the duplication picture. Yet for another example the size difference can result from the lack of coefficients in the duplicating picture or from an encoding scheme that represents motion vectors that represent zero motion in a concise manner. For example, variable length encoding can allocate a short (and even a shortest) codeword for representing a zero motion vector. Yet for another example, a sequence of zero motion vectors can be encoded by indicating its length, starting point or end point (run-length encoding).

Stage 120 can include stage 121 of generating a duplicating picture without motion vector fields; wherein a lack of motion vector fields in the duplicating picture is interpreted by a decoder as being indicative of a lack of motion. Thus, a decoder that receives the duplicating picture merely duplicates (copies without motion vectors) the other picture.

The dependency of the duplicating picture upon the other picture is usually inferred from the location of the duplicating picture within the video stream—for example—within a group of pictures that is dependent upon a reference picture. According to another embodiment of the invention the duplicating picture can include dependency information that is indicative of the dependency—which is the reference picture that is being duplicated by the duplicating frame.

Stage 120 can include stage 122 of generating a duplicating picture that substantially consists of a group of motion vector fields. Each motion vector of the motion vector fields is interpreted by a decoder as being indicative of a lack of motion. A maximal number of motion vectors within the non-reference picture is larger than a number of motion vectors of the group of motion vectors.

According to another embodiment of the invention the duplicating picture is encoded so that it is smaller than a picture that has multiple non-zero motion vectors. The duplicating picture can be encoded using variable length encoding, run length encoding or other encoding schemes in which zero motion vectors are represented by less bits than non zero motion vectors and, additionally or alternatively, sequences of zero motion vectors can be represented in a concise manner.

The maximal number of motion vectors within the non-reference picture can be at least four times bigger than a number of motion vectors of the group of motion vectors.

The maximal number of motion vectors within the non-reference picture can be at least ten times bigger than a number of motion vectors of the group of motion vectors.

Stage 130 can include stage 131 of selecting the non-reference picture in response to a resemblance between the non-reference picture and the other picture Stage 130 can include checking the resemblance of multiple non-reference pictures to the other picture and selecting the most similar pictures.

Stage 130 can include selecting a sequence of non-reference pictures of a video stream and replacing each of the sequence of the non-reference pictures by the duplicating picture.

Stage 130 can include selecting the sequence of non-reference pictures of the video stream in response to a resemblance between each of the sequence of non-reference pictures and the other picture. Thus instead of comparing the resemblance of single pictures the resemblance of an entire sequence is evaluated.

Stage 130 can be responsive to at least one parameter selected from a list consisting of: a required bit rate, a quality parameter, and an outcome of an emulation of the decoder.

Method 100 can include generating a duplicating picture that includes a representation of a set of N motionless motion vectors, wherein the representation of the set of N motionless motion vectors is smaller than a representation of a set of N motion vectors that includes a plurality of motion representative motion vectors (vectors that represent a non-zero motion); wherein N is an integer representative of a number of motion vectors. Such a representation can be obtained, for example, by applying variable length coding. Yet for another example zero motion vectors can have zero length—and do not include coefficients so that their encoded representation is shorter.

Method 100 can include generating a duplicating picture by encoding motion vectors so that a code word representative of a zero motion vector is smaller than a code word representative of a non-zero motion vector.

Method 100 can include generating a duplicating picture by providing a compressed representation of a sequence of zero motion vectors. This can be obtained by performing run length encoding or differential encoding.

Method 100 conveniently continues with providing the rate reduced video stream to an external system. It is noted that while the rate reduced video stream includes at least one duplication of a picture that replaces a non-reference picture, at least one other rate reduction technique (many of which are known in the art) before providing the rate reduced video stream. Likewise, the video stream may be received for non-reference pictures replacement after at least one other rate reductions technique have been applied to it, and/or the rate reduced video stream may be provided to further rate reduction by another at least one rate reduction techniques.

As at least one other rate reduction technique may be applied to the video stream on top of the non-reference picture replacement herein disclosed, it is noted that, according to an embodiment of the invention, at least one of the aforementioned selection rules is further responsive to at least one other rate reduction techniques. Especially, at least one of the aforementioned selection rules may apply both to the replacement of a non-reference picture as herein disclosed, and to another technique together, considering both of the techniques and application thereof to the video stream before selection.

Method 100 can be applied in additional to statistical multiplexing techniques.

Figure 2:
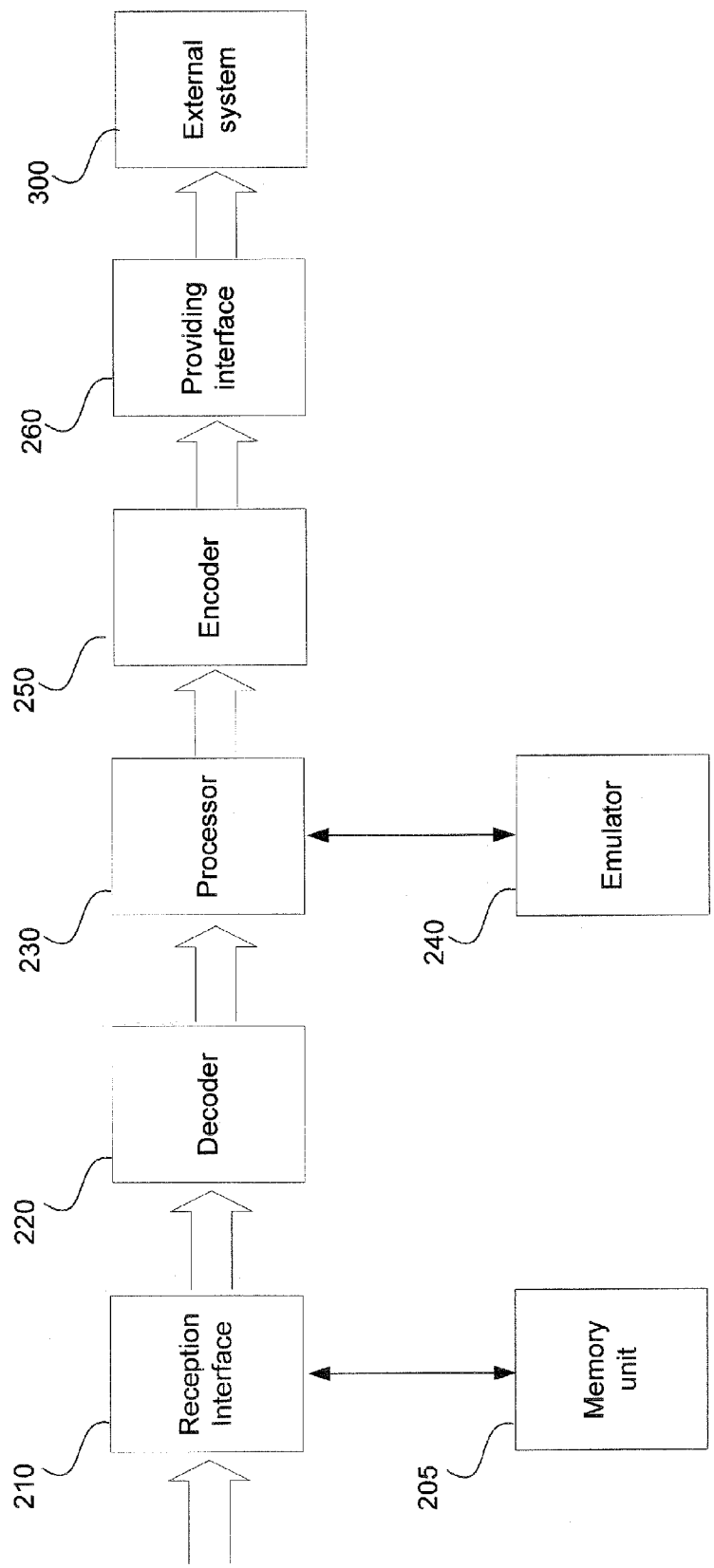
FIG. 2 illustrates a system according to an embodiment of the invention.

FIG. 2 illustrates system 200 according to an embodiment of the invention. System 200 can be a part of a media distribution network. It is followed by one or more links that can have limited bandwidth. The limitation can be temporary or permanent. It can result from the need for transferring other information over the link, physical limitations of the link, modulation limitations, signal to noise parameters, quality of service parameters and the like.

According to an aspect of the invention, a system for rate reduction of video streams is offered.

The system includes reception interface 210 for receiving a video stream (or a portion thereof), the bit rate of which should be reduced (wherein, according to an embodiment of the invention, the system is adapted to determine if a rate reduction is necessary). The interface is adapted to provide the received video stream or a portion thereof to a processor or other component (e.g. a decoder) of the system.

Reception interface 210 can include memory unit 205.

According to an embodiment of the invention, the system includes a decoder 220 adapted to partially decode the video stream (or portions thereof), wherein other components of the system may refer to the video stream or to the partially decoded video stream (wherein the henceforth used term video stream may refer to any of which).

The system also includes a processor 230 that is adapted to select a non-reference picture of the video stream, according to at least one non-reference picture selection rule. It is noted that, according to an embodiment of the invention, the selecting of the non-reference picture is preceded by detecting multiple non-reference picture of the video stream or of a portion thereof, wherein the detecting may be carried out by the processor or by other component of the system.

It is further noted that conveniently, the system and especially processor 230 is adapted to select and replace multiple non-reference picture, wherein one or more of the at least one non-reference picture selection rule may pertain to the selection of multiple non-reference pictures. It is further noted that one or more of the at least one non-reference picture selection rule conveniently pertain to reference pictures as well as to non-reference pictures. According to an embodiment of the invention, one or more of the at least one non-reference picture selection rule pertain to motion vectors of one or more pictures of the video stream.

It is noted that, according to an embodiment of the invention, one or more of the at least one non-reference picture selection rules (directed to select one or more non-reference pictures of the video stream) may be responsive to a required bit-rate, pertaining to a rate reduced video stream provided by the system, and/or to other quality factors, or additional factors.

Additionally, according to an embodiment of the invention, the system further includes an emulator 240 that is adapted to emulate an operation of a receiving device that is adapted to receive the rate reduced video stream, wherein the processor 230 is further adapted to the select the one or more non-reference picture is response to an emulation of a receiving device carried out by the emulator.

The processor 230 (or, according to other embodiments of the invention, other component of the system) is further adapted to replace the selected non-reference picture by a duplication of a picture of the video stream that is not the replaced non-reference picture.

It is noted that the duplication is conveniently an instruction to read the information pertaining to the duplicated picture. Furthermore, conveniently the duplicated picture used for the replacing is adjacent to the replaced non-reference picture (i.e. either immediately preceding it or immediately following it). The duplicated picture can be position immediately after or immediately before an anchor frame.

It is noted that, according to an embodiment of the invention, the processor is further adapted to select a picture to be duplicated prior to the replacement, according to at least one duplicated picture selection rule. Conveniently, the at least one duplicated picture selection rule is directed to select between the reference picture immediately preceding the non-reference picture and between the reference picture immediately following the non-reference picture.

According to an embodiment of the invention, one or more of the at least one duplicated picture selection rules pertain to motion vectors of one or more pictures of the video stream.

It is clear to a person who is skilled in the art that the replacing results in a rate reduction of the video stream (or of a portion thereof).

As aforementioned, the selecting and replacing of the non-reference picture may be repeated for multiple non-reference pictures.

System 200 can generate a duplicating picture that includes a representation of a set of N motionless motion vectors, wherein the representation of the set of N motionless motion vectors is smaller than a representation of a set of N motion vectors that includes a plurality of motion representative motion vectors; wherein N is an integer representative of a number of motion vectors. Such a representation can be obtained, for example, by applying variable length coding. Yet for another example zero motion vectors can have zero length—and do not include coefficients so that their encoded representation is shorter.

System 200 can generate a duplicating picture by encoding motion vectors so that a code word representative of a zero motion vector is smaller than a code word representative of a non-zero motion vector.

System 200 can generate a duplicating picture by providing a compressed representation of a sequence of zero motion vectors. This can be obtained by performing run length encoding or differential encoding.

It is further clear to a person who is skilled in the art that the system may also perform rate reduction as aforementioned only to a portion of a video stream. Additionally, the system may, according to an embodiment of the invention, perform rate reduction to multiple video streams (or portions thereof transmitted together, wherein at least one of the aforementioned selection rules may be pertain to multiple video streams (or portions thereof).

The system conveniently further includes a providing interface 260, adapted to provide the rate reduced video stream to an external system 300. It is noted that according to an embodiment of the invention, the system further includes an encoder 250 adapted to encode (or to partially encode) the video streams (or at least a portion thereof) prior to the providing to the external system.

It is noted that the system may be implemented in different ways, e.g. incorporating software, hardware, firmware, or any combination thereof.

The present invention can be practiced by employing conventional tools, methodology, and components. Accordingly, the details of such tools, component, and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:

1. A method for rate reduction of a video stream, the method comprises: selecting a non-reference picture of a video stream; and replacing the non-reference picture by a duplicating picture that substantially consists of information that instructs a decoder to duplicate another picture that differs from the non-reference picture; wherein the duplicating picture is smaller than the non-reference picture; wherein the method further comprises generating the duplicating picture to substantially consist of a group of motion vector fields; wherein each motion vector of the motion vector fields is interpreted by the decoder when the decoder decodes the video stream as being indicative of a lack of motion; wherein a maximal number of motion vectors within the non-reference picture is larger than a number of motion vectors of the group of motion vectors.

2. The method according to claim 1 wherein the duplicating picture is smaller than half of the non-reference picture.

3. The method according to claim 1 wherein the maximal number of motion vectors within the non-reference picture is at least four times bigger than a number of motion vectors of the group of motion vectors.

4. The method according to claim 1 wherein the maximal number of motion vectors within the non-reference picture is at least ten times bigger than a number of motion vectors of the group of motion vectors.

5. The method according to claim 1 comprising selecting the non-reference picture in response to a resemblance between the non-reference picture and the other picture.

6. The method according to claim 1 comprising selecting a sequence of non-reference pictures of a video stream and replacing each of the sequence of the non-reference pictures by the duplicating picture.

7. The method according to claim 6 comprising selecting the sequence of non-reference pictures of the video stream in response to a resemblance between each of the sequence of non-reference pictures and the other picture.

8. The method according to claim 6 wherein the selecting is responsive to at least one parameter selected from a list consisting of: a required bit rate, a quality parameter, and an outcome of an emulation of the decoder.

9. The method according to claim 1 wherein the duplicating picture represents a functional that is responsive to multiple reference pictures.

10. A system for rate reduction of a video stream, the system comprises: a memory unit configured to store pictures of a video stream; a processor configured to select a non-reference picture of a video stream; and replace the non-reference picture by a duplicating picture that substantially consists of information that instruct a decoder to duplicate another picture that differs from the non-reference picture; wherein the duplicating picture is smaller than the non-reference picture; wherein the processor is configured to generate the duplicating picture to substantially consist of a group of motion vector fields; wherein each motion vector of the motion vector fields is interpreted by the decoder when the decoder decodes the video stream as being indicative of a lack of motion; wherein a maximal number of motion vectors within the non-reference picture is larger than a number of motion vectors of the group of motion vectors.

11. The system according to claim 10 wherein the duplicating picture is smaller than half of the non-reference picture.

12. The system according to claim 10 wherein the maximal number of motion vectors within the non-reference picture is at least four times bigger than the number of motion vectors of the group of motion vectors.

13. The system according to claim 10 wherein the maximal number of motion vectors within the non-reference picture is at least ten times bigger than the number of motion vectors of the group of motion vectors.

14. The system according to claim 10 wherein the processor is configured to select the non-reference picture in response to a resemblance between the non-reference picture and the other picture.

15. The system according to claim 14 wherein the processor is configured to select a sequence of non-reference pictures of the video stream and replace each of the sequence of the non-reference pictures by the duplicating picture.

16. The system according to claim 15 wherein the processor is configured to select the sequence of non-reference pictures of the video stream in response to a resemblance between each of the sequence of non-reference pictures and the other picture.

17. The system according to claim 15 wherein the processor is configured to select in response to at least one parameter selected from a list consisting of: a required bit rate, a quality parameter, and an outcome of an emulation of the decoder.

18. The system according to claim 10 wherein the duplicating picture represents a functional that is responsive to multiple reference pictures.

* * * * *